3,439,930
TILTING MECHANISM FOR AUTOMOBILE
Jeun Young Park, 32 Savoy Road,
Framingham, Mass. 01701
Filed Apr. 11, 1967, Ser. No. 630,126
Int. Cl. B62d 9/02; B60g 21/00, 25/00
U.S. Cl. 280—111                                3 Claims

ABSTRACT OF THE DISCLOSURE

An automotive vehicle is provided with hydraulically operable mechanism which permits rocking of the vehicle body on bumpy roads when the front vehicle wheels are not deflected but which tilts the body when the steering wheel is turned, to counteract centrifugal forces on the body as it rounds a curve.

---

This invention relates to mechanism for tilting an automotive vehicle inward when rounding a curve so as to reduce the possibility of the vehicle being overturned by centrifugal forces when rounding a corner at high speed and to reduce the tendency on the part of people and objects in the vehicle to be urged outward under the same circumstances. When the vehicle is being steered straight ahead, it is free to rock in either direction as when travelling on a road with bumps and depressions. The operation of the mechanism is controlled by turning the steering wheel of the vehicle but it can readily be disconnected from the steering mechanism for travel at slow speeds over rough roads. Under such circumstances the operation of the tilting mechanism is not needed or desirable.

For a more complete understanding of the invention, reference may be had to the following description thereof, and to the drawings, of which FIGURE 1 is an elevation of the significant portion of the tilting mechanism, partly broken away to show interior members;

FIGURE 2A is an exploded view of the parts of the locking device for disconnecting the tilting mechanism from the steering wheel;

Figure 1:
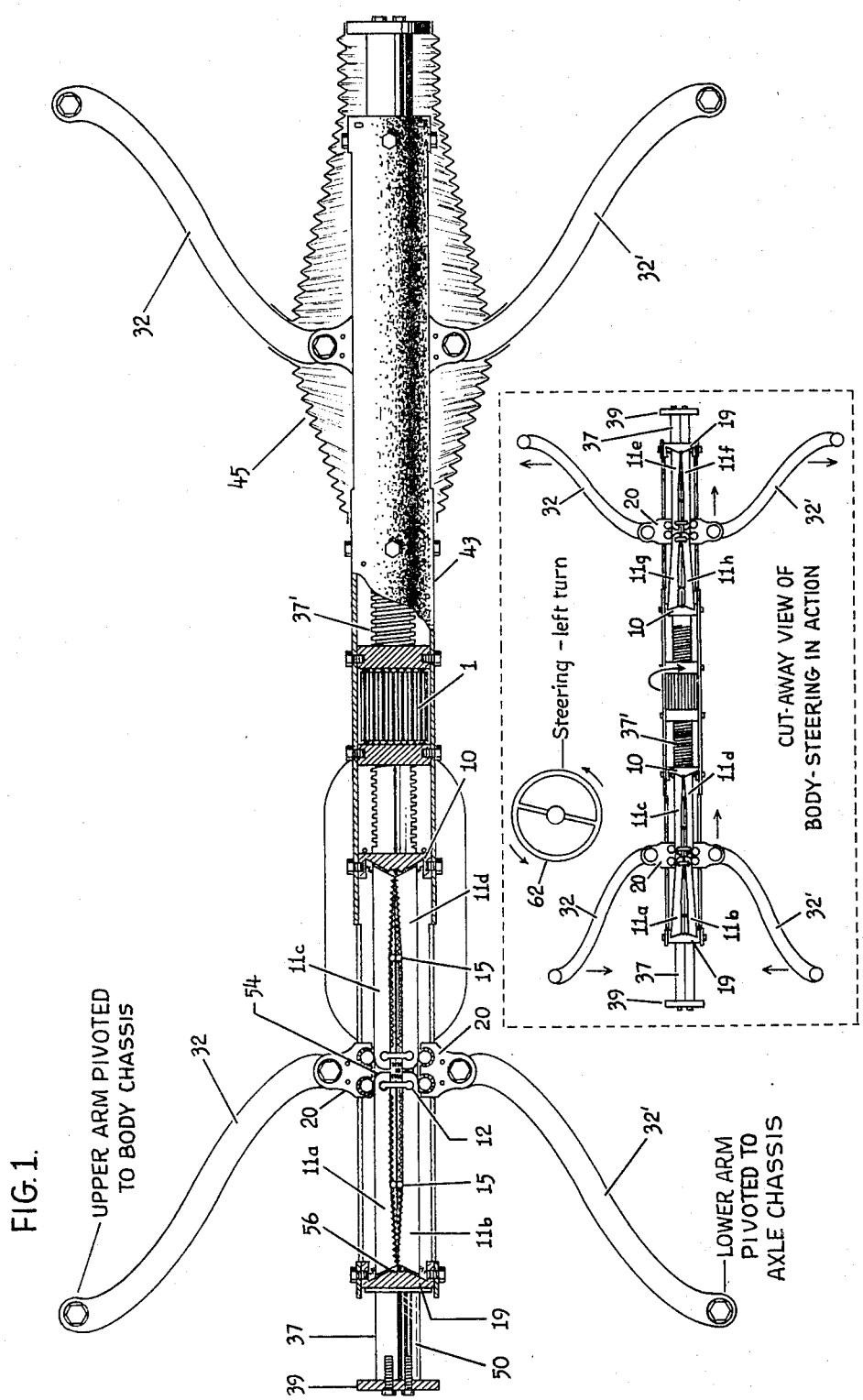
FIGURE 1A is a sectional view, on a smaller scale, of the mechanism shown in FIGURE 1, the parts being in a different position of operation.

The tilting mechanism is symmetrical with respect of the center axis of the vehicle so that a description of the right hand or left hand half of the mechanism will serve as a description of the other half.

When the mechanism is operated, a central pinion 1 is rotated by an elongated roller gear 2 which is rotatably mounted on a transverse bar 38 and has a bevel gear 3 secured to an end of it by which it is driven. The pinion 1 is confined between bearing rings 8 which are secured by bolts 9 to a casing 43 which travels to the right or left with the pinion 1 when the latter is rotated. For this purpose the pinion 1 is interiorly threaded with ball bearings for engagement with a threaded mid portion 37′ of a main bar 37 which is parallel to the roller bar 38 and is secured thereto by end pieces 39 which are bolted to the ends of both bars and do not move axially.

Figure 3:
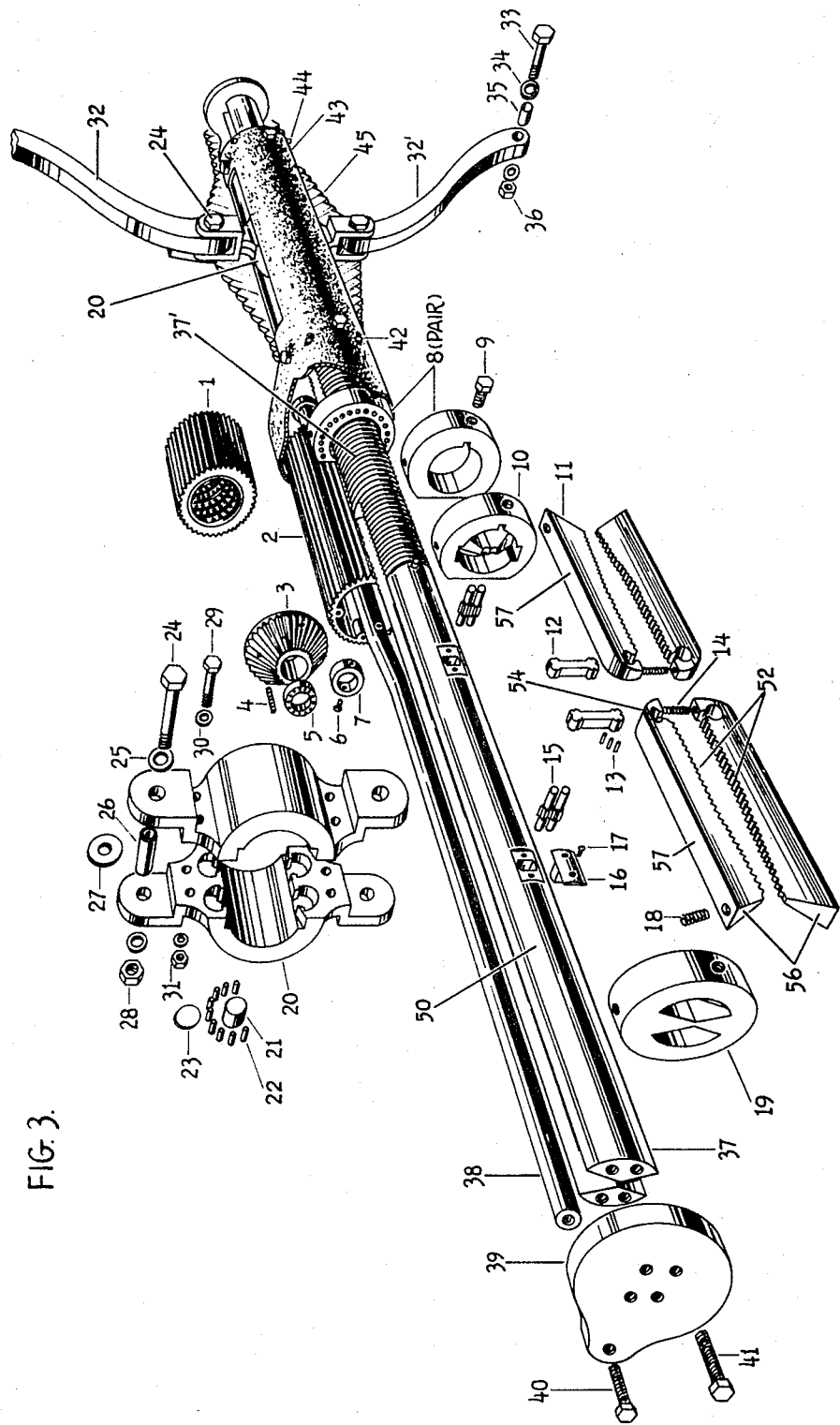
FIGURE 3 is an exploded perspective view of the mechanism shown in FIGURE 1.

As indicated in FIGURE 3, the main bar 37 is longitudinally split from both ends so that it is forked in both directions from its mid portion. The legs 50 of the forks are sector-shaped in cross-section and fit slidably through similarly shaped openings in abutment members 10, 19 which are within the casing 43 and bolted to it. Between the legs of each fork of the main bar 37 are upper and lower V-grooves in which are fitted pairs of arm-locking racks 11 in the form of triangular prisms. These are individually numbered 11a to 11h in FIGURE 1A. As indicated in FIGURES 1 and 3, the mutually opposed edges 52 of each pair of racks are provided with gear teeth engaged by two small pinions 15 which are mutually meshed and are journalled in the legs 50. The two pairs of racks 11 between each pair of legs 50 are arranged end-to-end in the V-grooves, the mutually adjacent ends 54 of the racks being rounded, the mutually remote ends 56 being beveled. The inclined end surfaces bear against similarly inclined surfaces on faces of the abutment members 10 and 19 and the faces 57 of the racks are parallel. As indicated in FIGURE 1, the rounded ends 54 of each pair of racks 11 are connected by links 12 which hold these ends of the racks in constantly spaced relation but permit the racks to rock so that the other ends can move away from each other. When the racks are in their normal relative positions, as in FIGURE 1, the opposed toothed edges 54 are uniformly spaced apart for more than half the distance from the rounded ends of the racks to the other ends. The remainder of the toothed edges normally converge. The small pinions 15 are normally positioned where the parallel portions of the racks start to converge. Thus, for example, if the casing assembly (including the racks 11) starts to move axially, that is, transversely with respect to the vehicle, such movement is relative with respect to the pinions 15, the pinions being journalled in the stationary main bar 37. If the casing assembly moves to the right, as in FIGURE 1A, the pinions 15 at the left spread the beveled ends of the racks 11a and 11b between which they are located thus causing these racks to rock about the link 12 which connects their rounded ends so that their normally parallel faces 57 converge toward the rounded ends.

Figure 4:
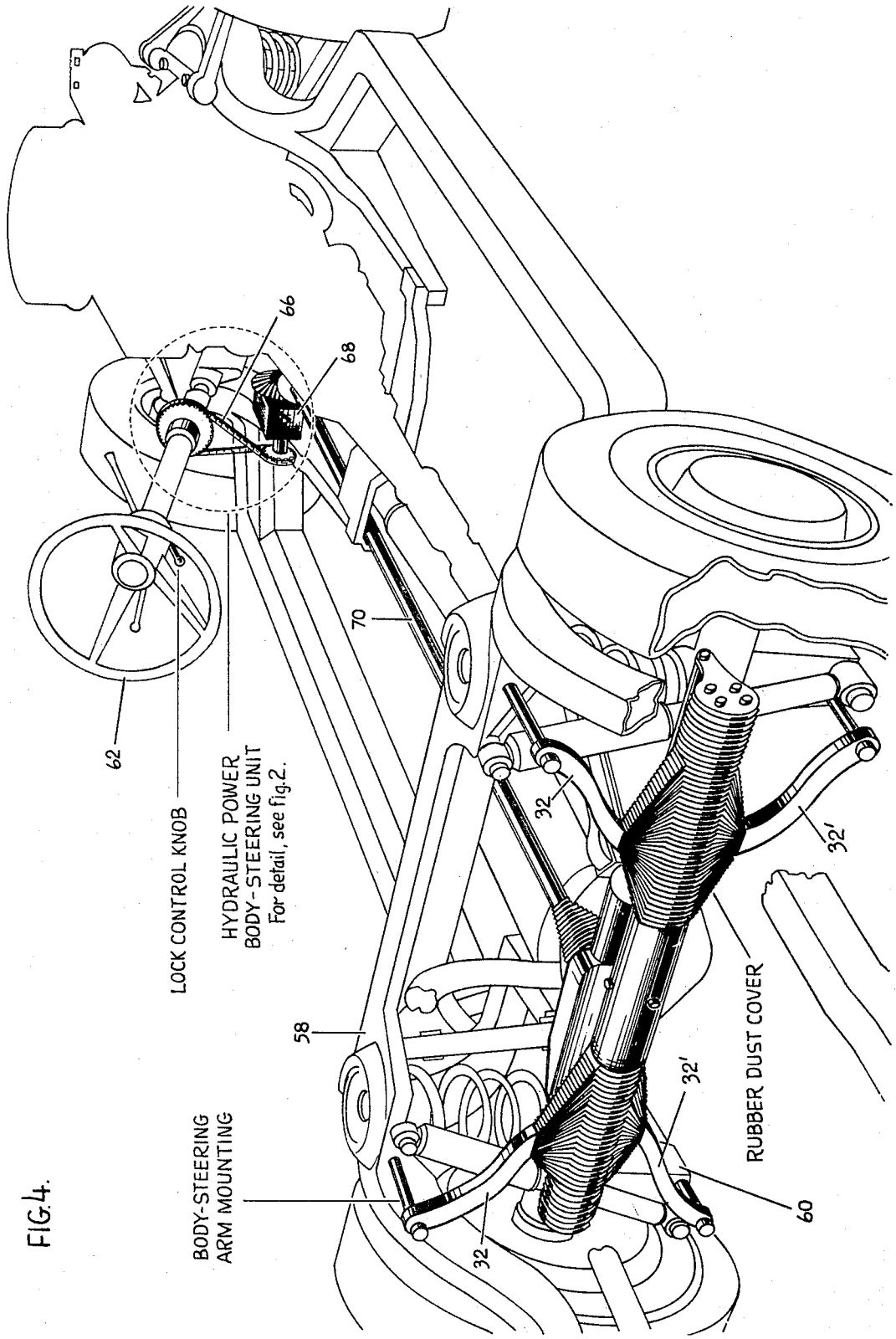
FIGURE 4 is a perspective view of the steering and tilting mechanism with parts of the chassis indicated in outline.
Figure 5:
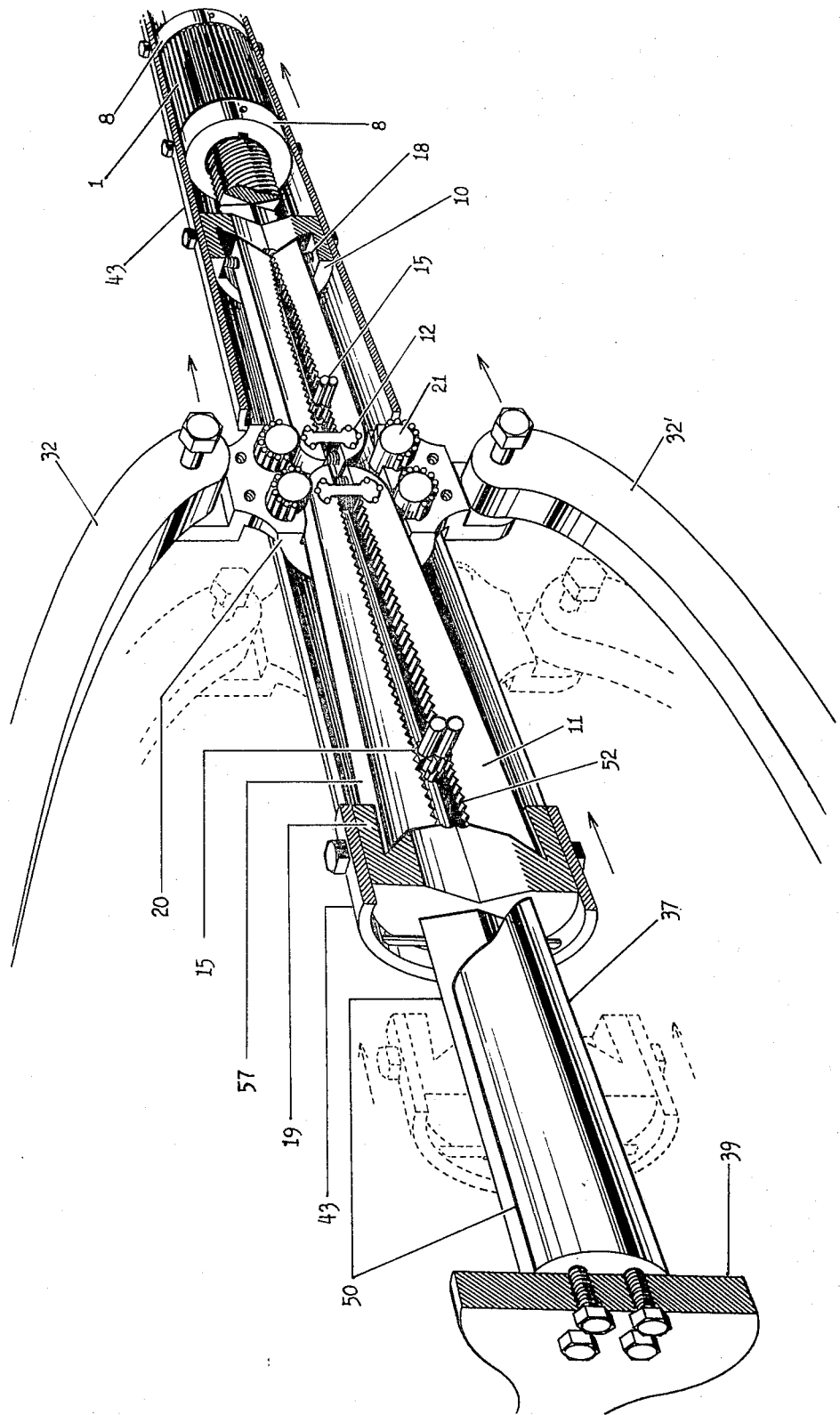
FIGURE 5 is a perspective view, on a larger scale, of part of the mechanism shown in FIGURE 1, part of the housing being broken away to show interior parts.

The rounded ends of both pairs of racks 11 are normally surrounded by an arm bracket 20. This bracket carries four rollers 21 which bear respectively on the four rounded ends of the two pairs of racks 11. An upper arm 32 is pivotally attached at one end to the bracket 20 and at the other end to the chassis 58 of the vehicle, a portion of which is shown in FIGURE 4. A lower arm 32′ is pivotally attached at one end to the bracket 20 and at the other end to the trailing arm 60. These arms and their connecting bracket thus form a toggle joint. The arms of each toggle joint slope outward from the bracket so that when the arms of either toggle joint move toward each other, the bracket which connects them moves toward the center of the bar 37. When the bracket 20 moves toward the right, the remote ends of the arms 32, 32′ will approach each other. In other words, the side of the vehicle body to which the arm 32 is attached will be lowered. Likewise, if the bracket 20 moves to the left, that side of the vehicle body will be raised. When the vehicle is proceeding straight forward, bumps or depressions in the road may cause the arms 32, 32′ to rock with the result that the bracket will slide back and forth on the racks 11, the flat faces 57 of the four racks normally being parallel. If the steering wheel of the vehicle is turned, the center pinion 1 turns by connections hereinafter described. This causes the casing 43 to move axially together with the abutment members 10, 19 and the racks 11. Since the pairs of pinions 15 are anchored in the main bar 37, one or the other pair causes the racks with which they are meshed to rock so that their flat sides 57 converge toward the rounded ends 54 over which is the bracket 20. These racks thus carry the bracket 20 along with them as they move with the casing 43. Such motion of the bracket 20 rocks the arms 32, 32' to lift or lower that side of the vehicle body to which the upper arm 32 is attached.

Figure 2:
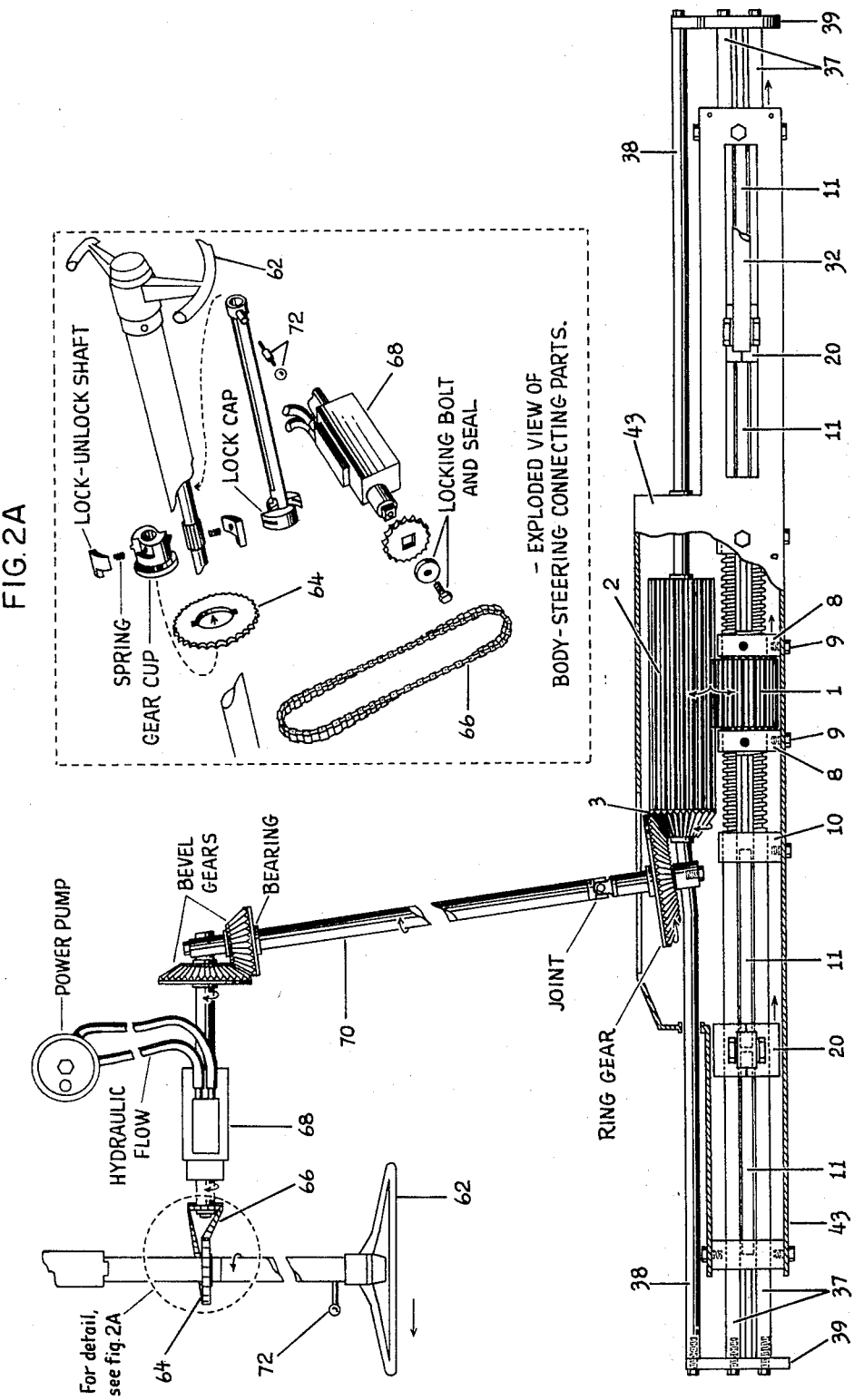
FIGURE 2 is a plan view of the steering and post with mechanism connecting them to the tilting device.

The mechanism connecting the steering wheel 62 of the vehicle with the center pinion 1 is illustrated in FIGURE 2. The steering wheel turns a sprocket wheel 64 which is connected by a chain 66 to a servo-motor 68 which operates through a gear system 70 to rotate the main roller gear 2 and the center pinion 1. A suitable locking mechanism is operable by a conveniently located lever 72 by which the operator can disconnect the entire tilting mechanism from the steering wheel. This may be desirable when traveling at low speeds or over rough roads.

An example of the operation of the tilting mechanism is shown in FIGURE 1A. If the steering wheel 62 is turned to the left, as indicated by arrows, the center pinion 1 is rotated in the direction to cause it to move to the right along the threaded portion of the main bar 37. The center pinion carries with it the casing 43 and the racks 11. The pairs of pinions 15, which do not move to the right, cause the racks 11a and 11b to spread so that the bracket 20L is moved along with the casing toward the right. In like manner the racks 11g and 11h are spread so that the bracket 20R is also moved toward the right. These movements of the brackets lower the left side of the vehicle body and elevate the right side of the body, thus tilting the body inward for the left turn. This tilting mechanism may be used not only for passenger vehicles but also for trucks, buses or other commercial vehicles which normally carry heavy loads.

The tilting mechanism is preferably installed at the front or rear of the vehicle where the heaviest load is on the vehicle wheels.

I claim:

1. Body-tilting mechanism for an automotive vehicle having a chassis, trailing arms and steering means, comprising an elongated bar, two toggle joints slidable on said bar near the respective ends thereof, each said toggle joint consisting of a bracket slidably embracing said bar and a pair of arms pivotally attached at one end to said bracket, the other ends of said arms being adapted to be pivotally attached respectively to the chassis and trailing arms of a vehicle, each of said toggle joints being arranged so that when said other ends of its arms approach each other its bracket moves toward the center of said bar, and means movable along said bar in either direction and operable to move both said brackets along in the same direction, whereby to tilt said chassis in the direction opposite to the movement of said brackets.

2. Mechanism as described in claim 1, said means comprising a casing surrounding most of said bar, means operable to move said casing axially with respect to said bar, and means operable by relative movement between said casing and bar to engage a side of each said bracket whereby to push said brackets along with said casing.

3. Mechanism as described in claim 2, said bar having a screw-threaded midportion, said means operable to move the casing including a hollow pinion internally threaded and in threaded engagement with said midportion of the bar, and abutment elements bearing against the ends of said pinion and secured to said casing.

References Cited

UNITED STATES PATENTS

| | | | |
|---|---|---|---|
| 2,820,646 | 1/1958 | Kolbe | 280—112 |
| 1,980,934 | 11/1934 | Simpson | 280—112 |

PHILIP GOODMAN, *Primary Examiner.*

U.S. Cl. X.R.

280—112